Figure 1:
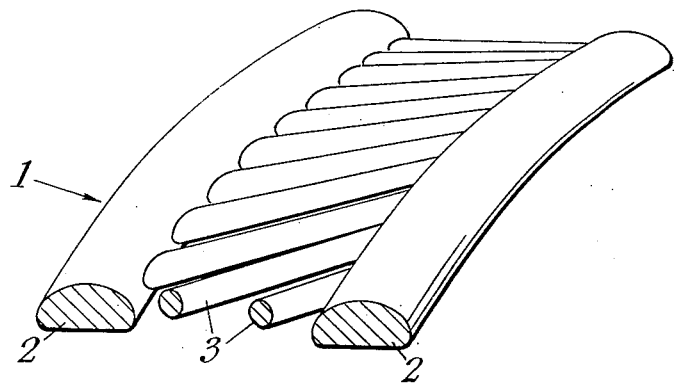

Aug. 7, 1956  D. R. HENSON  2,757,701
REINFORCEMENT OF RUBBER ARTICLES

Filed Nov. 6, 1952  4 Sheets-Sheet 1

Inventor
Douglas Ronald Henson
by Benj. T. Rauber
his attorney

Aug. 7, 1956 — D. R. HENSON — 2,757,701
REINFORCEMENT OF RUBBER ARTICLES
Filed Nov. 6, 1952 — 4 Sheets-Sheet 3

Aug. 7, 1956    D. R. HENSON    2,757,701
REINFORCEMENT OF RUBBER ARTICLES
Filed Nov. 6, 1952    4 Sheets-Sheet 4

Inventor:
Douglas Ronald Henson
by Benj. T. Raube
his attorney

United States Patent Office 2,757,701
Patented Aug. 7, 1956

2,757,701
REINFORCEMENT OF RUBBER ARTICLES

Douglas Ronald Henson, Erdington, Birmingham, England, assignor to Dunlop Tire and Rubber Corporation, Buffalo, N. Y., a corporation of New York Application November 6, 1952, Serial No. 319,024
Claims priority, application Great Britain November 7, 1951

17 Claims. (Cl. 152—357)

My invention relates to the reinforcement of pneumatic tyre covers.

Heretofore it had been customary to reinforce tyre covers with a plurality of layers of cotton or rayon cords, the extremities of which are wrapped round steel bead wires. The cords are embedded in rubber and lie at a bias angle to the bead wires.

My invention provides a novel reinforcement for tyres which facilitates their production and reduces the amount of labour required.

According to my invention a tyre reinforcement comprises a pair of bead rings connected by a web forming an integral structure and made from a thermoplastic polymeric material.

The reinforcement is preferably made by moulding the beads and the connecting web in one operation and then stretching the web and the beads so that the tenacity of the material is increased in the direction of stretch.

The web may be in the form of a plurality of parallel filaments at a suitable bias angle to the bead rings after stretching. Alternatively it may be in the form of a film, which is preferably perforated or slit to improve the bonding characteristics with the rubber portions of the tyre. Suitable materials for a tyre reinforcement are nylon and the thermoplastic polymer of terephthalic acid sold under the registered trademarks "Terylene" and "Dacron."

The reinforcement is advantageously moulded as a tube, the bead rings forming the ends thereof, and then partly stretched by drawing the bead rings apart at an elevated temperature. In the case of a filament the rings may be relatively rotated to provide or maintain the bias angle of the filaments. Final stretching may take place when the web is subjected to internal pressure in a toroidal mould.

My invention further comprises a method of making a tyre reinforcement by moulding a pair of bead rings connected by a web to form an integral structure of a thermoplastic polymeric material and then stretching the web to increase the tenacity of the material in the direction of stretch.

According to the invention also there is provided a pneumatic tyre cover having a reinforcement comprising at least one pair of bead rings connected to a web and forming an integral structure of a thermoplastic polymeric material.

The reinforcement may be moulded in the form of two spaced apart co-axial bead rings connected by a co-axial tubular web formed by a film or a plurality of parallel filaments forming an integral part of the mouldings, and stretching of the web may be carried out by clamping the bead rings and then drawing them apart in an axial direction. Tubular webs exhibiting increased tenacity in a particular direction relative to the bead rings may be produced by stretching the webs axially and simultaneously relatively rotating the bead rings so that the stretching is combined with twisting of the web. To obtain the desired angle the relative amount by which the material is twisted and stretched must be appropriately chosen.

In order to obtain a web exhibiting increased tenacity when extended circumferentially, the diameter of the tubular web may be increased simultaneously with the diameter of the bead rings. This may be effected by the application of internal pressure to the beads and web by mechanical means, e. g. by means of rollers relatively movable apart so as to stretch the web and bead rings to increase their diameters.

Stretching of the tubular web may be effected by a combination of the methods of stretching just described. For instance, the web may be stretched by the application of internal pressure and simultaneously stretched by drawing the bead rings apart. Furthermore simultaneous application of internal pressure to the tubular web, drawing apart of the bead rings and relative rotation of the bead rings may be effected to suitably stretch the web.

A tubular web made of nylon may be stretched while subjected to an elevated temperature, e. g. while immersed in hot water, or alternatively it may be stretched cold. The further stretching of the web which takes place when the reinforcement is bent by internal pressure to toroidal shape during the construction of a tyre cover is taken into account when drawing the rings apart so that the final dimensions of the reinforcement in the direction of stretch shall be of the order of 400% of the dimensions as moulded.

In order to increase the purchase of the rubber portion of the tyre cover which is subsequently applied to a reinforcement having a film-type web, the film may be perforated or slit. A plurality of parallel slits may be formed in the film at an angle to the bead rings and adjacent thereto or may alternatively extend from the bead to a point which, when the reinforcement is built into a tyre, will be adjacent to the tyre crown. The slits may also extend from bead to bead. If the film is stretched after slitting the direction in which the tenacity of the material is increased is determined by the slits.

Although the reinforcements described above relate to a single ply, two or more such layers of reinforcement may be combined to form a double or multiple reinforcement. Thus the two layers may be combined, the bead rings of the layers being a complementary D shape to form a bead of circular cross section.

Furthermore, reinforcement layers having film-type webs may be combined with layers having filament-type webs.

A reinforcement having a film-type web may also be moulded in substantially toroidal shape; after which stretching is performed by internal air pressure the toroidal shape being maintained after stretching.

Figure 2:
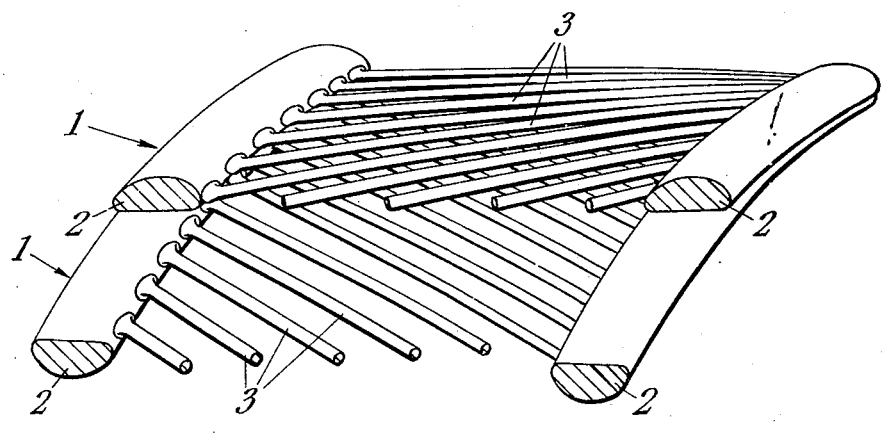
Figure 3:
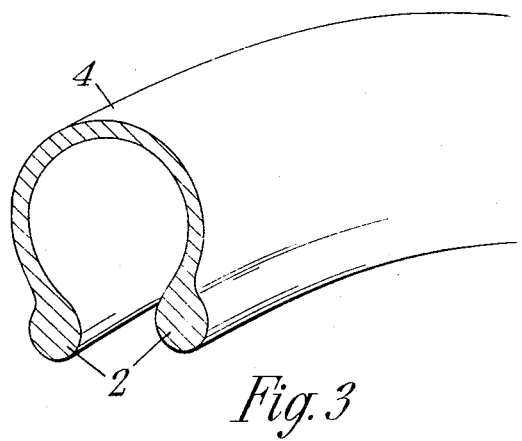
Figure 4:
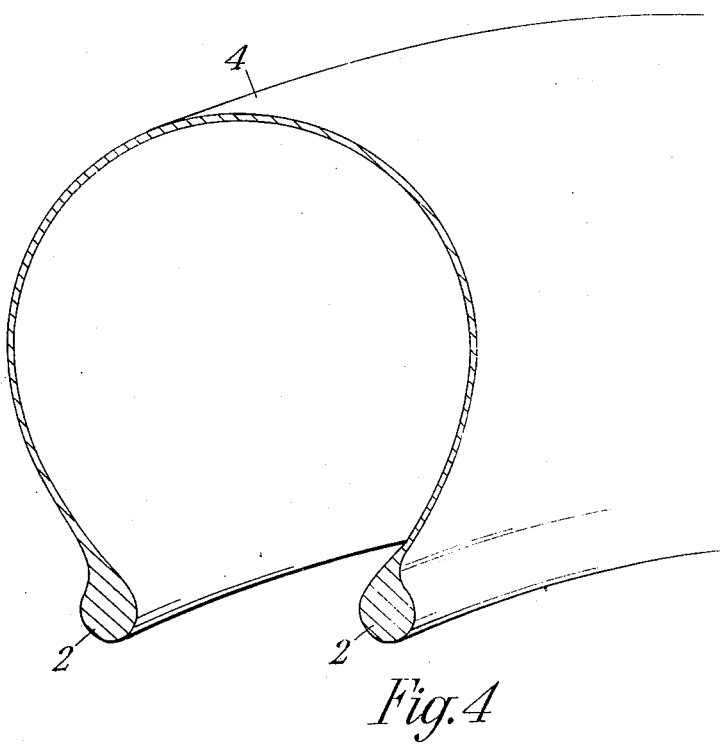
Figure 5:
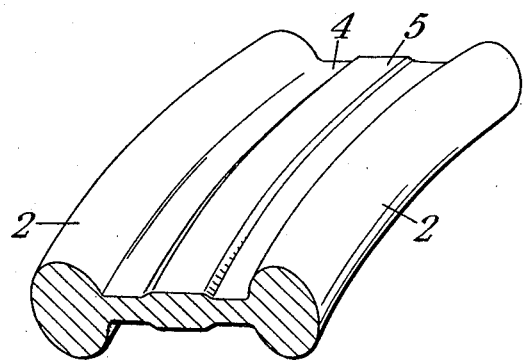
Figure 7:
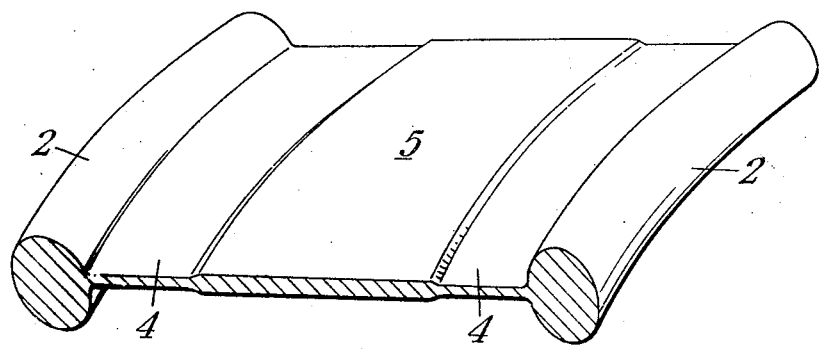
Figure 6:
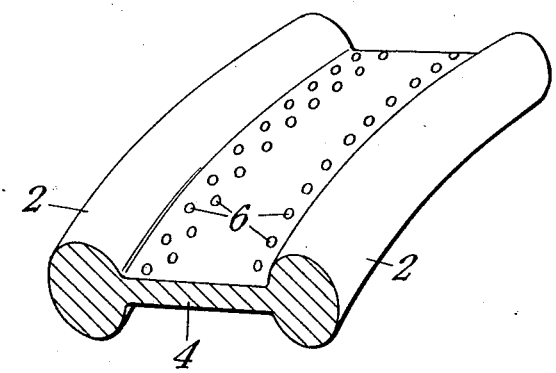
Figure 8:
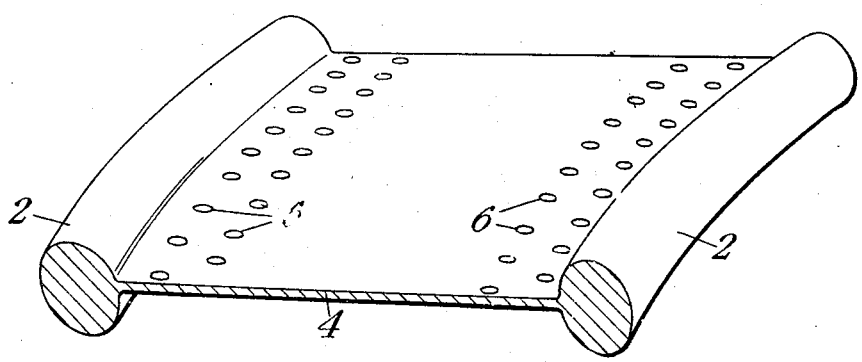

The invention will now be more particularly described with reference to the accompanying drawings wherein:

Figure 1 shows a fragmentary perspective view of a moulded reinforcement consisting of two bead portions connected by a filamentary web, Figure 2 shows a similar view of two such reinforcements after stretching forming a two ply reinforcement for a tyre, Figure 3 shows a fragmentary perspective view of a moulded tyre reinforcement having a web formed from a continuous film, Figure 4 shows a similar view of the reinforcement after stretching to a toroidal shape, Figures 5 and 6 show fragments of moulded reinforcements wherein two bead portions are connected by a film and Figures 7 and 8 show the same reinforcements after stretching the film.

In the embodiment of the invention shown in Figure 1 a reinforcement for a pneumatic tyre cover is moulded from a thermoplastic condensation product of high molecular weight such as nylon or the thermoplastic polymer of terephthalic acid known under the registered trademarks "Terylene" and "Dacron."

The moulding 1 takes the form of two spaced-apart co-axial D-section rings 2 spanned by filaments 3 at a bias angle to the rings. After moulding the rings are clamped and drawn apart at an elevated temperature until the final length of the filaments is of the order of 400% of their unstretched length. The rings are also partly rotated in opposite directions about their axis to maintain the bias angle of the filaments.

The drawing operation increases the tensile strength of the material and reduces its "creep" in service.

The rings may alternatively be moulded with the filaments parallel with the axis of the rings and the bias angle can be produced in the drawing operation.

To construct a tyre, two reinforcement mouldings are treated with a bonding agent of the polyisocyanate class such as the polyurethane plastic known under the registered trademark "Desmodur" R which is a triphenyl methane trisocyanate and each is embedded in a layer of unvulcanised rubber and assembled so that complementary D-shaped rings are brought together to form tyre beads, the bias angle of the two sheets of filaments being in opposite directions as shown in Figure 2 wherein the layers of rubber are omitted for the sake of clarity. The tyre cover is fabricated on a building drum in the conventional manner using the rubberised reinforcement in place of cord plies and is then vulcanised in a mould in the usual manner.

The above construction employs two layers of reinforcement but if desirable a greater number of layers can be used with complementary rings forming the tyre bead.

If necessary only one reinforcing layer can be incorporated in a tyre the bead rings in this case being substantially circular in section.

In the embodiment shown in Figure 3 a single tyre reinforcement of nylon or "Terylene" moulded in substantially toroidal shape comprises a pair of bead elements in the form of co-axial spaced apart rings connected by a film-like web 4. The moulding is subjected to internal air pressure at an elevated temperature sufficient to stretch the film radially into contact with the inner surface of a toroidal mould located co-axially around the moulding whereupon the moulding assumes the shape indicated in Figure 4. In this manner the tenacity of the film is increased approximately in a radial direction.

In the embodiment shown in Figure 5 a moulded tyre reinforcement comprises a pair of bead rings 2 connected by a tubular film-type web 4, the centre part 5 of the web being thickened. The rings 2 are clamped and drawn apart so that the reinforcement assumes the shape shown in Figure 7. The part 5 of the reinforcement serves to provide extra strength to the tyre cover in the region of the tread when the reinforcement is incorporated in the cover.

Perforation may be provided locally in the film and in a concentric ring or rings. As shown in Figures 6 and 8 two concentric rings of perforations 6 may be provided at the two locations in the reinforcement which form the middle of the side walls of the tyre cover, the perforations serving to increase their flexibility.

The rubber portion of a tyre i. e. tread and sidewalls are applied to a reinforcement by supporting a reinforcement on a building drum and placing a composite tread and sidewall of rubber compound over the reinforcement in known manner. If the reinforcement is made up from two or more units a thin strip of rubber is located between each unit so as to separate the units thereby preventing mutual friction between units in the finished tyre.

The rubber portion of the tyre may alternatively be applied to the reinforcement by the injection moulding or rubber casting technique.

What I claim is:

1. An integral molded tire reinforcement which comprises a web of a thermoplastic polymer and a pair of spaced bead rings of thermoplastic polymer, one at each side of and integral with said web and of greater thickness than that of said web.

2. A tire reinforcement according to claim 1 wherein the web is formed by a plurality of parallel filaments arranged at a suitable bias angle to the bead rings.

3. A tire reinforcement according to claim 1 wherein the web is formed by a film of material.

4. A tire reinforcement according to claim 3 wherein the film is provided with a thickened portion in a zone thereof intermediate of the beads to underlie the tread portion of a tire.

5. A tire reinforcement according to claim 3 wherein the film is foraminous.

6. A method of making a tire reinforcement comprising moulding a pair of bead rings integrally connected by a web to form an integral structure of a thermoplastic polymeric material and then stretching the web to increase the tenacity of the material in the direction of stretch.

7. A method according to claim 6 wherein the stretching is performed by simultaneously drawing the bead rings apart and relatively rotating them in opposite directions.

8. A method according to claim 6 wherein the stretching is performed by fluid pressure applied in a direction normal to the surface of the film such that the film assumes a substantially toroidal shape after stretching.

9. A method according to claim 6 wherein the rings are also stretched.

10. A method according to claim 6 wherein the stretching is performed at an elevated temperature.

11. A pneumatic tire cover having embedded therein a reinforcement comprising at least one pair of bead rings comprising a thermoplastic polymeric material integrally connected by a web of said material of less thickness than that of said bead rings forming a molded integral structure of a thermoplastic polymeric material.

12. A pneumatic tire cover according to claim 11 having two reinforcements, adjacent bead rings thereof being of complementary D-cross-section and arranged to form a bead of circular cross-section.

13. A pneumatic tire cover according to claim 11 wherein adjacent webs are separated by a strip of rubber.

14. A pneumatic tire cover according to claim 11 wherein the reinforcement is bonded to the rubber portion of the tire cover by a bonding agent of the polyisocyanate class.

15. A tire reinforcement comprising a pair of axially spaced bead rings comprising a thermoplastic polymeric material and a web connecting and integrally molded with said bead rings, said web being of thermoplastic polymeric material.

16. The tire reinforcement of claim 15 in which said web has openings between said bead rings.

17. The tire reinforcement of claim 16 in which said openings are transverse slits.

References Cited in the file of this patent

UNITED STATES PATENTS

| | | |
|---|---|---|
| 903,714 | Hawley | Nov. 10, 1908 |
| 1,366,220 | Swinehart | Jan. 18, 1921 |
| 1,453,217 | Weigel | Apr. 24, 1923 |
| 1,559,142 | Ames | Oct. 27, 1925 |
| 1,611,998 | Comstock | Dec. 28, 1926 |
| 2,317,911 | Hoff | Apr. 27, 1943 |
| 2,355,744 | Myers | Aug. 15, 1944 |
| 2,411,659 | Manning | Nov. 26, 1946 |
| 2,531,059 | Krotz | Nov. 21, 1950 |
| 2,620,009 | Giebhart | Dec. 2, 1952 |
| 2,698,042 | Perkins | Dec. 28, 1954 |

OTHER REFERENCES

De Bell: "German Plastic Practice," 1946; pages 300–316, pages 472, 473.